April 29, 1930.   A. H. BOWLZER, JR   1,756,276
SLIDING BEARING BUSHING FOR PUMP CONSTRUCTION
Filed April 26, 1927   2 Sheets-Sheet 1
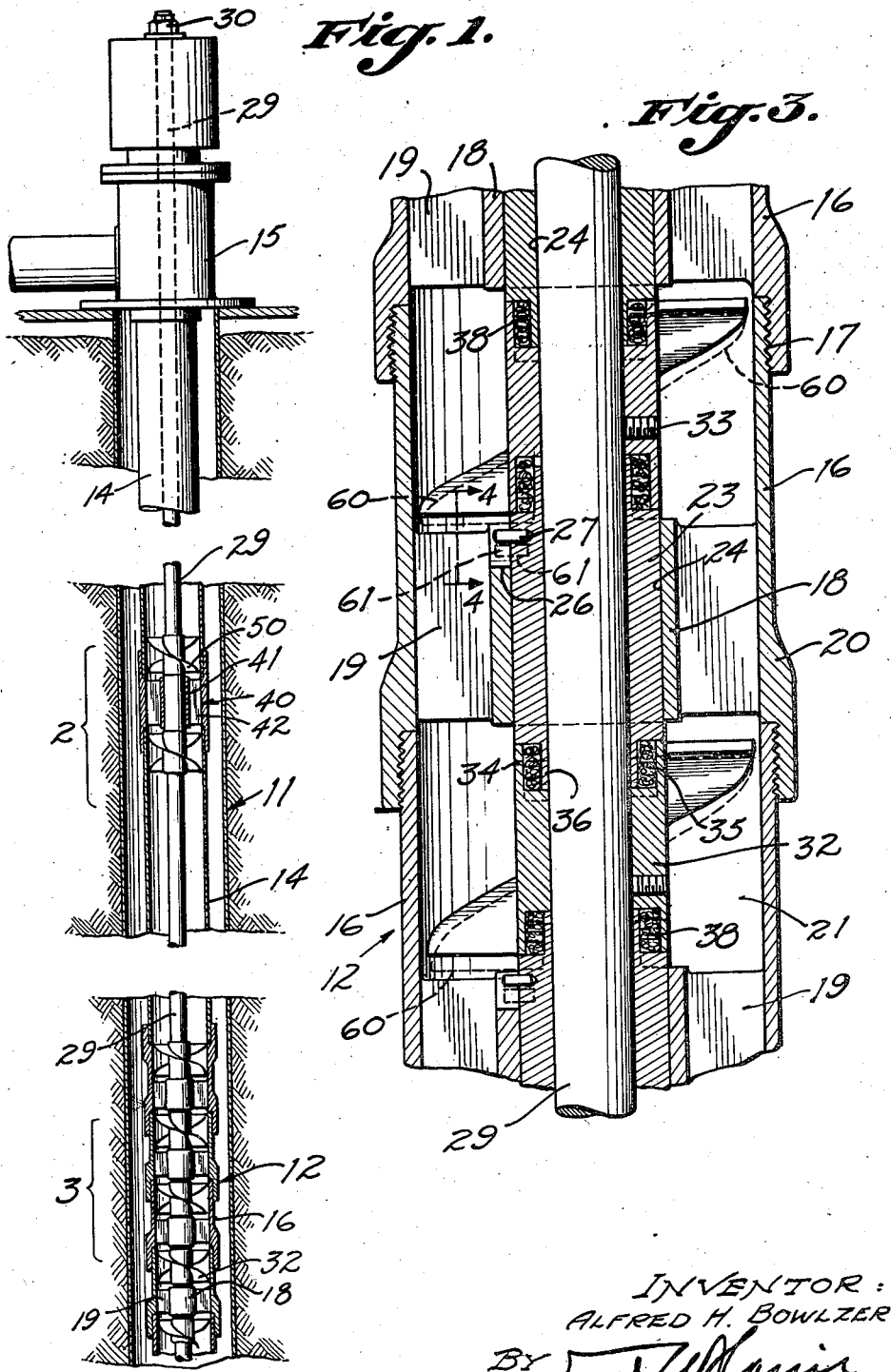
INVENTOR:
ALFRED H. BOWLZER JR.
BY
ATTORNEY.

April 29, 1930.  A. H. BOWLZER, JR  1,756,276
SLIDING BEARING BUSHING FOR PUMP CONSTRUCTION
Filed April 26, 1927  2 Sheets-Sheet 2
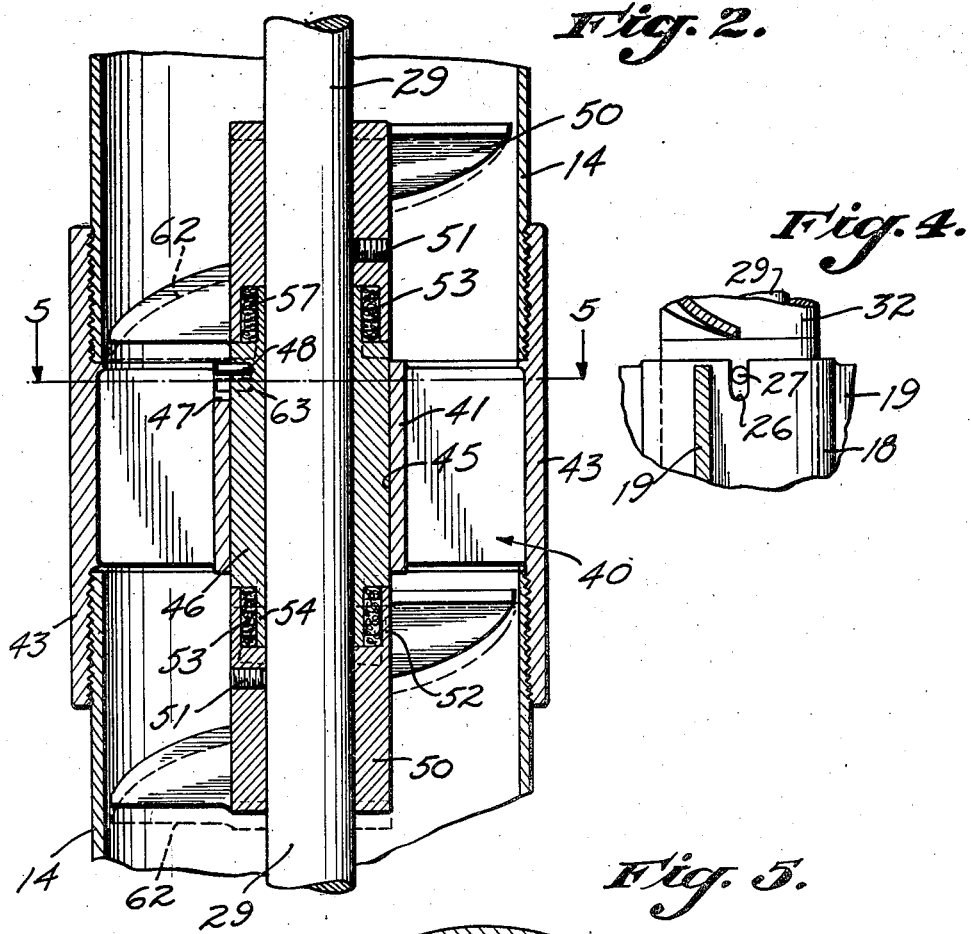

Patented Apr. 29, 1930

1,756,276

UNITED STATES PATENT OFFICE

ALFRED H. BOWLZER, JR., OF LOS ANGELES, CALIFORNIA, ASSIGNOR, BY MESNE ASSIGNMENTS, TO KIMBALL-KROGH PUMP COMPANY, A CORPORATION OF DELAWARE

SLIDING BEARING BUSHING FOR PUMP CONSTRUCTION

Application filed April 26, 1927. Serial No. 186,639.

This invention relates to improvements in turbine irrigation pumps.

The ordinary turbine irrigation pump includes a pump unit which is located below the liquid level in a well. This pump unit consists of sections having bearing supports in which bearings are carried. Chambers are provided between the bearing supports in which impellers of the pump are located. A shaft extends through the bearings, and the impellers are secured to the shaft so that they rotate therewith. The pump section is attached to the lower end of a column pipe which extends upward to the surface of the ground, the shaft extending to the surface of the ground through the column pipe. The column pipe usually includes bearing supports which carry column bearings through which the shaft passes. In some types of pumps impellers are secured to the shaft at intervals throughout the length of the column pipe, usually adjacent to the column bearings. At the upper end of the well is a pump head, by means of which the shaft is rotated.
The pump head includes means for regulating the vertical position of the shaft. Before the pump can be put into operation the upper end of the shaft must be lifted so as to remove the slack therefrom and so as to lift the impellers into a substantially central position in the chambers of the pump unit so that all of the weight of the shaft and impellers will be carried by a bearing in the pump head. In the ordinary form of pump the bearings are rigidly secured in the bearing supports, and it is therefore necessary to provide a clearance between the ends of the bearings and the impellers. This clearance must be provided so that the impellers can be lifted upward so that they will clear the bearings and so that they are entirely supported from the upper end of the shaft. It is a disadvantage to leave a clearance because of the fact that an entrance for sand to pass into the bearing is provided. In the present constructions, however, there is no alternative and consequently this disadvantage must be endured.

One of the objects of my invention is to provide a pump of the character described in which the shaft may be suspended from the head bearings without leaving any spaces between the ends of the bearings and the impellers.

It is often necessary to keep pumps running continuously over long periods of time. In such cases if it is necessary to keep the pump out of service for a long time to permit taking the bearing supports to a machine-shop and there press out the old bushings and fit new bushings, pressing new bushings into place, the loss of time constitutes a serious inconvenience. Moreover, pumps are frequently situated at great distances from machineshop facilities and are often repaired at night to avoid shutting down the pump during the daytime. Under such circumstances it is extremely important that means be provided for repairing pump bearings without the necessity of transporting them to machine-shops having proper equipment for repairs.

One of the objects of my invention is to provide a pump construction in which the bearing bushings may be readily removed and replaced without requiring any special equipment. It will be evident that this is very advantageous inasmuch as it permits the bushings to be replaced near the well and in a short period of time.

Other objects and advantages of the invention will be made evident hereinafter.

Referring to drawings in which I illustrate my invention:

Fig. 1 is a vertical view showing a pump construction embodying the features of my invention.

Fig. 2 is an enlarged section showing a portion of the column pipe as indicated by the brackets 2 of Fig. 1.

Fig. 3 is an enlarged section of a portion of the pump unit of the invention, this view being taken as indicated by the bracket 3 of Fig. 1.

Fig. 4 is an enlarged fragmentary view taken as indicated by the line 4—4 of Fig. 3.

Fig. 5 is a section taken on the line 5—5 of Fig. 2.

Referring first to Fig. 1, 11 represents a well in which the pump of this invention is installed. The pump includes a pump unit

12 which is located below the liquid level of the well, a column pipe 14 to the lower end of which the pump unit is secured and which extends upward from the pump unit to the surface of the ground, and a pump head 15 which is placed at the surface of the ground or at the upper end of the well and to which the column pipe is secured.

The pump unit, as illustrated on an enlarged scale in Fig. 3, consists of sections 16 which are provided with male and female ends so that they may be secured together as noted at 17. The sections 16 are provided with cylindrical hubs or bearing supports 18 which are carried by radial webs or vanes 19 in positions concentric with shells 20 of the sections 16. Between adjacent bearing supports 18 are impeller chambers 21. The bearing supports 18 receive bearings 23. These bearings 23 have cylindrical outer faces which are of such diameters that they may be easily placed in cylindrical openings 24 of the bearing supports 18. The bearing supports 18 are provided with cavities 26 which connect with upper faces thereof as shown in Figs. 3 and 4. The bearings 23 are provided with outward extending pins 27 which project into the cavities 26. The purpose of these pins and cavities is to permit the bearings 23 to move axially in the bearing supports 18 but not be rotatable therein. Supported by the bearings 23 is a pump shaft 29 which extends upward through the column pipe 14 and the head 15. The upper end of the shaft 29 is provided with an adjustment nut 30 so that this shaft may be moved axially. Positioned in the chambers 21 are impellers 32, the impellers 32 being rigidly secured to the shaft 29 in any suitable manner such as by set screws 33. The impellers 32 have annular lips 34 which provide annular cavities 35. The bearings 23 have inner annular lips 36 which are adapted to extend inside the cavities 35. The annular lips 34 are of the same outer diameter as the outer diameter of the bearings 23 and of the body portions of the impellers 32. The annular lips 36 have inner diameters which are of the same size as the openings through the bearings which receive the shaft 29. It should be noted that the lips 34 or 36 engage the ends of the bearings 23 and the ends of the body portions of the impellers 32. Placed in the annular cavities 35 is a packing 38 which is adapted to provide a seal which will prevent water or sand from passing from the chambers 21 into the bearings 23.

The column pipe 14 at various positions throughout its length is provided with column joints 40 which are constructed as shown in detail in Fig. 2. The joints 40 have cylindrical hubs or bearing supports 41 which are carried by radial webs or vanes 42, these webs or vanes projecting inward from a shell 43 of the joint 40. The bearing supports 41 are substantially the same as the bearing supports 18 of the pump unit. It should be understood that making the bearing supports of the column pipe integral with the joint is a desirable arrangement but is not essential, and, if desired, the bearing supports may be made separate and located in other positions than at the joints. This construction is optional. Extending through cylindrical openings 45 of the bearing supports 41 are bearings 46 which are of such an outer diameter that they may be readily slipped into the openings 45. The bearing supports 41 are provided with cavities 47 which connect with the upper ends thereof and to which pins 48 carried by the bearings 46 extend. The purpose of this construction is the same as the identical construction provided in the pump unit; that is, to permit the bearings to move axially in the bearing supports but not to rotate therein. The pump shaft 29 extends through the bearings 46 and has impellers 50 rigidly secured thereon on opposite sides of the bearings 46, this securement being effected in any suitable manner such as by set screws 51 as shown. The impellers 50 are provided with annular lips 52 at the ends adjacent to the bearings 46, these annular lips having outer diameters of the same size as the outer diameters of the bearings 46 and the bodies of the impellers, and providing annular cavities 53. The bearings 46 have annular lips 54 which have openings of a size to receive the shaft 29 and which are extended into the annular cavities 53. The annular cavities 53 are provided with packing 57 to provide a seal which prevents sand and water from getting into the bearings 46.

After the parts have been installed in the well as shown in Fig. 1, the first thing to do is to lift the shaft 29 and the impellers in the pump unit into central positions in the chambers 21. Before the shaft is lifted the impellers 32 occupy positions indicated by dotted lines 60 in Fig. 3. The lower ends of the impellers 32 at this time rest against the upper faces of the bearing supports 18. The bearings 23 occupy entirely the spaces between the ends of the impellers 32 and consequently are lower than their normal positions. The pins 27 occupy positions at this time indicated by dotted lines 61. Referring to Fig. 2 the impellers 50 in the column pipe 14 occupy positions indicated by dotted lines 62, the bearings 46 occupy positions lower than their normal positions, and the pins 47 occupy positions indicated by dotted lines 63. To remove the slack from the pump shaft 29 to centralize the impellers the adjustment nut 30 is rotated so as to lift the upper end of the pump shaft until the weight of the shaft is carried by the bearings in the pump head. If the slack is removed from the pump shaft the lower end thereof is moved upward and the impellers in the pump unit and in the column pipe are moved upward from the dotted line positions in Figs. 2 and 3 into their normal positions as indicated by full lines. In view of the fact that there is no space between the bearings and the impellers and in view of the fact that the bearings may move axially, these bearings will move upward with the impellers.

The feature of eliminating the spaces between the bearings and the impellers and at the same time being able to adjust the positions of the impellers without creating a space between them and the bearings is of primary importance to the invention. A great deal of wear results from sand getting into the bearings of a pump, so by keeping out the sand it will be seen that much wear is eliminated.

A further feature of the invention is the bearing construction, per se. As pointed out heretofore it has always been necessary to drive the bushing from the bearing supports by special equipment. In my invention the bearings may be very easily removed from the bearing supports without the use of special equipment, and this may be done at the well by the laymen.

Although this invention has a particular utility in rotary well pumps it is not limited thereto and may have application in various other arts; therefore, in some of the claims which are appended hereto I have broadly specified the impellers as elements.

I claim as my invention:

1. In a rotary pump, the combination of: a plurality of spaced bearing supports; a plurality of bearings, one being supported by each bearing support, said bearings being movable in an axial direction relative to said bearing supports but not rotatable relative thereto; a shaft adapted to rotate in said bearings; an element secured to said shaft between said bearings, the extremities of said element being in contact with the adjacent ends of said bearings; and means for axially moving said shaft, either of said bearings being capable of moving axially with said element.

2. In a rotary pump, the combination of: a plurality of spaced bearing supports; a plurality of bearings, one being supported by each bearing support, said bearings being movable in an axial direction relative to said bearing supports but not rotatable relative thereto; a shaft adapted to rotate in said bearings; an impeller secured to said shaft between said bearings, the extremities of said impeller being in contact with the adjacent ends of said bearings; and means for axially moving said shaft, either of said bearings being capable of moving axially with said impeller.

3. In a rotary pump, the combination of: a bearing support; a bearing supported by said bearing support, said bearing being non-rotatable with respect to said bearing support, but being axially movable relative thereto; a shaft rotatably supported by said bearing; and an impeller secured to said shaft in contact with said bearing, said bearing being movable in an axial direction with said impeller when said shaft is moved axially.

4. In a rotary pump, the combination of: a bearing support; a bearing supported by said bearing support, said bearing being non-rotatable with respect to said bearing support but being axially movable relative thereto; a vertical shaft journalled in said bearing; and elements secured to said shaft above and below said bearing support, and in contact with the ends of said bearing.

5. In a rotary pump, the combination of: a bearing support; a bearing supported by said bearing support, said bearing being non-rotatable with respect to said bearing support but being axially movable relative thereto; a vertical shaft journalled in said bearing; elements secured to said shaft above and below said bearing support; and flow-impeding means between said bearing and said elements.

6. A combination as defined in claim 4 in which at least one of said elements is in the form of an impeller.

7. In a rotary pump, the combination of: a bearing support; a bearing supported by said bearing support, said bearing being non-rotatable with respect to said bearing support but being axially movable relative thereto; a vertical shaft journalled in said bearing; elements secured to said shaft above and below said bearing support in a manner to move said bearing when said shaft is moved axially; and flow-impeding means between said bearing and said elements, said means comprising telescoping annular lips on said bearing and on said elements.

8. In a rotary pump, the combination of: walls forming a fluid passage; a bearing support in said fluid passage; a bearing vertically slidable in said support but being non-rotatable with respect thereto; a shaft journalled in said bearing; impellers secured to said shaft above and below said bearing and in close juxtaposition thereto, the vertical position of said impellers determining the position of said bearing in said bearing support; and means for axally moving said shaft to move said impellers into a position where they do not engage said bearing supports.

In testimony whereof, I have hereunto set my hand at Los Angeles, California, this 18th day of April, 1927.

ALFRED H. BOWLZER, Jr.